US008005746B2

(12) United States Patent
Conwell

(10) Patent No.: US 8,005,746 B2
(45) Date of Patent: Aug. 23, 2011

(54) AUCTION METHODS AND SYSTEMS

(75) Inventor: William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 401 days.

(21) Appl. No.: 11/733,094

(22) Filed: Apr. 9, 2007

(65) Prior Publication Data

US 2007/0239594 A1    Oct. 11, 2007

Related U.S. Application Data

(60) Provisional application No. 60/790,676, filed on Apr. 10, 2006.

(51) Int. Cl.
*G06Q 40/00* (2006.01)
*G06Q 30/00* (2006.01)
(52) U.S. Cl. .................. 705/37; 705/14.71; 705/26.3
(58) Field of Classification Search .............. 705/37, 705/14.71, 26.3
See application file for complete search history.

(56) References Cited

U.S. PATENT DOCUMENTS

| | | | | |
|---|---|---|---|---|
| 5,116,049 A | * | 5/1992 | Sludikoff et al. | 273/139 |
| 6,199,050 B1 | * | 3/2001 | Alaia et al. | 705/37 |
| 6,321,212 B1 | * | 11/2001 | Lange | 705/36 R |
| 6,501,765 B1 | * | 12/2002 | Lu et al. | 370/447 |
| 6,665,649 B1 | | 12/2003 | Megiddo | |
| 6,830,514 B2 | * | 12/2004 | Meyer et al. | 463/17 |
| 7,079,547 B2 | * | 7/2006 | Lu et al. | 370/463 |
| 7,299,207 B1 | | 11/2007 | Gologorsky | |
| 7,349,876 B1 | * | 3/2008 | Veach | 705/35 |
| 7,590,589 B2 | * | 9/2009 | Hoffberg | 705/37 |
| 7,640,189 B2 | * | 12/2009 | Sandholm et al. | 705/26 |
| 2001/0037278 A1 | | 11/2001 | Messmer | |
| 2001/0037279 A1 | * | 11/2001 | Yeo | 705/37 |
| 2003/0018562 A1 | | 1/2003 | Guler | |
| 2003/0018564 A1 | | 1/2003 | Bonnier | |
| 2003/0093357 A1 | | 5/2003 | Guler | |
| 2003/0220866 A1 | | 11/2003 | Pisaris-Henderson | |
| 2003/0225677 A1 | * | 12/2003 | Sandholm et al. | 705/37 |
| 2005/0049956 A1 | | 3/2005 | Ballman | |
| 2006/0106714 A1 | | 5/2006 | Goldberg | |
| 2006/0200401 A1 | | 9/2006 | Lisani | |
| 2006/0274364 A1 | | 12/2006 | Hasseler | |
| 2007/0016513 A1 | * | 1/2007 | Kelly et al. | 705/37 |
| 2007/0022040 A1 | * | 1/2007 | Gordon | 705/37 |
| 2007/0032286 A1 | * | 2/2007 | Muir | 463/16 |
| 2007/0050281 A1 | | 3/2007 | Hoffman | |
| 2007/0124229 A1 | | 5/2007 | Ku | |
| 2007/0130004 A1 | | 6/2007 | Borgs | |
| 2007/0136176 A1 | | 6/2007 | Niedermeier | |
| 2008/0021812 A1 | | 1/2008 | Gologorsky | |

OTHER PUBLICATIONS

Wang, Wenli et al. Shill Bidding in Multi-round Online Auctions. Proceedings of the 35th Hawaii International Conference on System Sciences—2002.*
Perrigne, Isabelle. Random Reserve Prices and Risk Aversion in Timber Sale Auctions. Oct. 2003.*
Feige, "On the Competitive Ratio of the Random Sampling Auction," LNCS vol. 3828, 9 pp., 2005.
Wurman, "The Michigan Internet AuctionBot—A Configurable Auction Server for Human and Software Agents," Proc. Of the 2d Int'l Conf. on Autonomous Agents, 8 pp., May 1998.

* cited by examiner

*Primary Examiner* — Jagdish Patel
*Assistant Examiner* — Kenneth Bartley

(57) ABSTRACT

Known auction techniques are modified to provide various benefits. In one arrangement, a pseudo-random function is employed to determine whether a nominally-ended auction should be extended, allowing an unsuccessful remorseful bidder a possible further chance to win the auction. A variety of other features and arrangements are also detailed.

9 Claims, 3 Drawing Sheets

AUCTION METHODS AND SYSTEMS

RELATED APPLICATION DATA

This application claims priority to provisional application 60/790,676, filed Apr. 10, 2006.

TECHNICAL FIELD

The present technology relates to auctions. In some embodiments, the technology addresses issues of bidder's remorse and seller's remorse.

BACKGROUND

The technology detailed herein is applicable to all manner of auctions. The four most familiar styles of auction are the ascending-bid auction (also called the English auction), the descending-bid auction (also called the Dutch auction), the first-price sealed-bid auction, and the second-price sealed bid auction (also called the Vickrey auction). However, the present concepts are applicable in all types of auction arrangements, including those detailed in the following patent publications: U.S. Pat. Nos. 5,794,207, 6,216,114, 6,466,917, 6,606,607, 6,671,674, 6,892,186, 6,985,885, 7,162,446, 20040128224, 20050228736, and 20050234806.

This technology is applicable in traditional live auctions, and in on-line auctions like EBay. (Such auctions are familiar, e.g., in the context of selling collectibles, real estate, commodities, thoroughbred horses and farm stock, used automobiles, timber, etc.) Moreover, this technology is applicable in automated auctions, and in auctions that are employed as mediation processes to arbitrate entitlement to limited resources. (Such auctions include automatically allocating dynamic packet bandwidth assignments, trading electricity, allocating pollution rights, selling debt instruments and financial securities, etc.) Such principles can similarly be included in simultaneous multiple-round auctions of the sort employed by the US Federal Communications Commission in their spectrum auctions, as well as in other combinatorial auctions.

Moreover, the principles herein can be applied to traditional auctioneer-seller auctions (in which one or more sellers seek a highest price for goods or services from bidders who wish to obtain same), and in procurement, auctioneer-buyer auctions (in which one or more buyers seek a lowest price for goods/services from bidders who wish to provide same). Still further, the detailed arrangements are applicable both in private auctions (where the identities of the bidders are hidden) and in public auctions.

DETAILED DESCRIPTION

Figure 1:
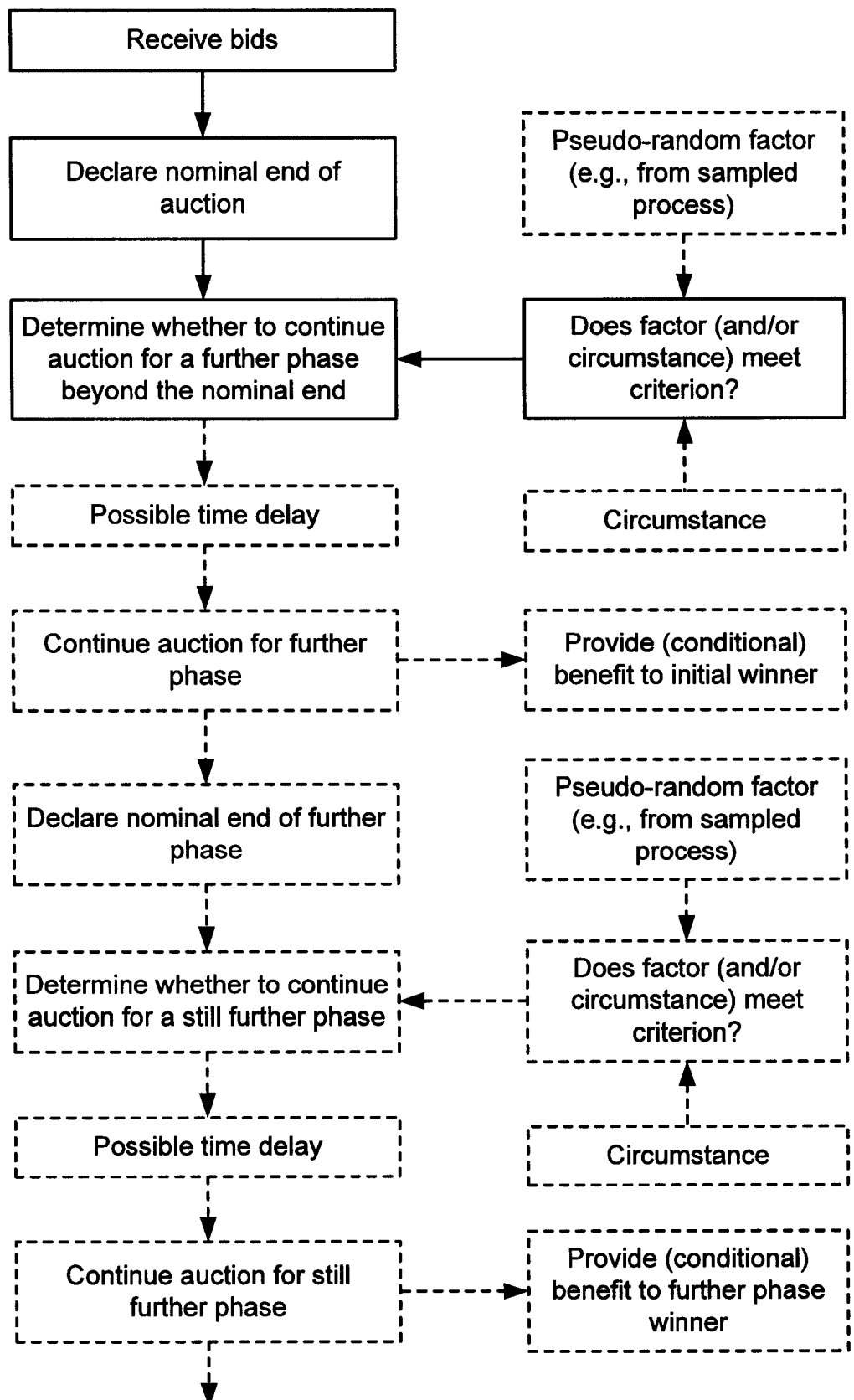
FIGS. 1-4 detail illustrative arrangements of the presently-described technology.
Figure 2:
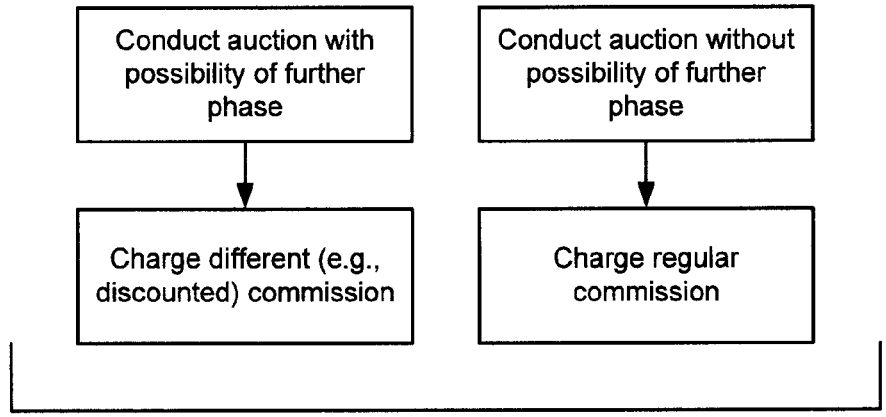
Figure 3:
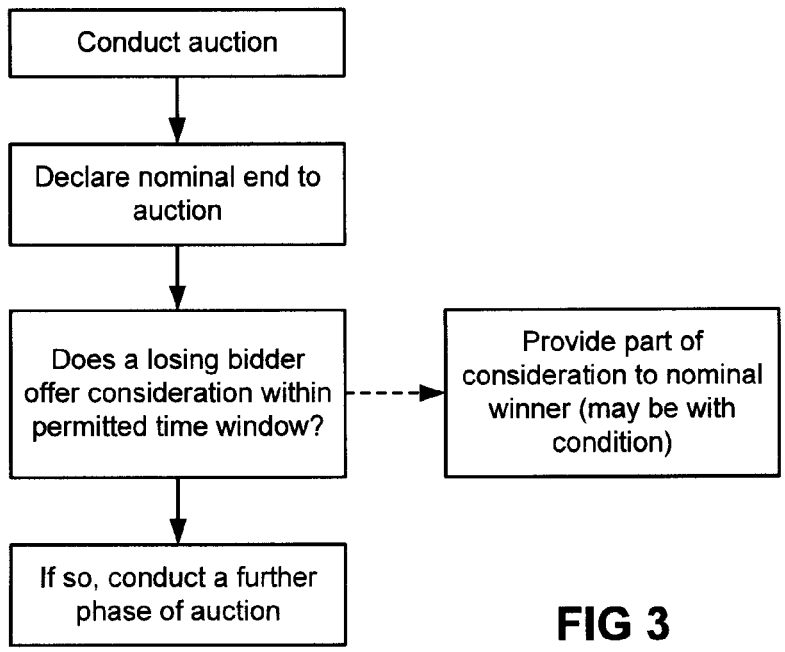
Figure 4:
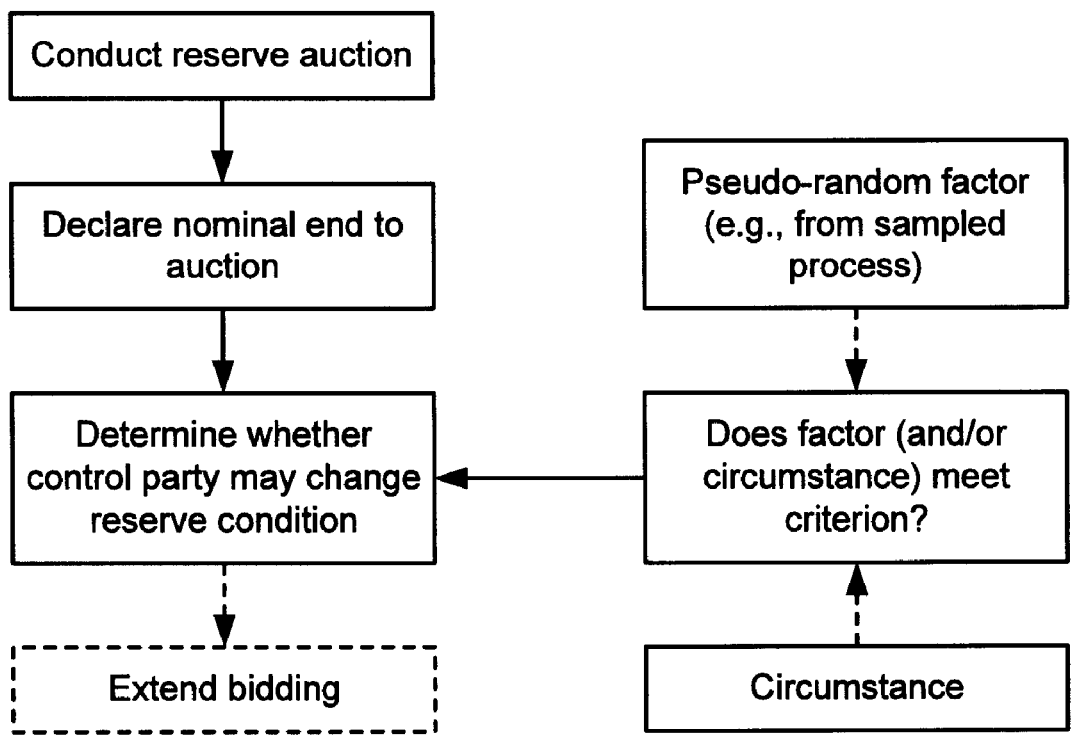

For expository convenience, the following discussion focuses on the case of an ascending bid live auction. However, it will be recognized that this is exemplary only, and that the principles can likewise be applied to the other forms and types of auctions.

In one method an auction proceeds in the normal fashion. However, at the nominal end of the auction—when the auctioneer hammers the lot closed—the hammer does not necessarily signal the true end of the auction. Instead, it stops a fast clock that has been free-running (e.g., since the beginning of the lot) on a board visible to the bidders (electronic circuitry can sense the hammer blow, e.g., by force or sound, and issue a "stop" signal to clock circuitry). At the hammer blow, the clock freezes and the last digit (e.g., expressing the elapsed time in thousandths of a second) is examined. If the digit is even, the auction is truly over. If the digit is odd, the auction is only at a nominal end, and a second phase follows.

In this latter case the auction enters a second phase—either immediately, or after an intervening period (e.g., a minute, an hour, a day, etc.). The period of any delay may not be predetermined, but may be determined as needed—in some cases by reference to a process that includes a pseudo-random factor.

The second phase of the auction may be of a different style than the original phase. An auction that is of the ascending bid variety in its first phase may be followed by a first-price sealed-bid in a second phase (and so forth for the other combinations/permutations).

The possibility of a second auction phase may be desirable from several standpoints. For example, an unsuccessful bidder may experience "loser's remorse" and wish they had bid higher prior to the end of the auction. Such remorse may be exclusively emotional, or may be rational.

Rational remorse may occur, e.g., where an unsuccessful bidder's view of fair value in an auction changes after the auction's end. For example, such a bidder may learn additional facts that can be applied prior to the end of the second phase. Or such a bidder can simply learn the identity of the nominal winner of the auction, and this additional information may cause such a bidder to reassess their terminal bid.

For example, consider an auction for a patent. Most bidders may have cross-licensing agreements with each other, so they are generally outcome neutral as to which bidder wins the patent. However, if the winning bidder is the one exception—the party who does not have a cross-licensing agreement with the others—then having such a party win the patent may give rise to significant infringement liability to the losing bidders. In this case the losers may quickly regret not bidding higher. In a second phase of the auction, one or more losers may bid higher to try and beat the former winner. In some cases, losers may collaborate (e.g., by jointly finding a high bid) to try and change the auction outcome.

Similarly, in some auction arrangements, the bidders do not know if they are losers until the nominal end of the auction, and this again may prompt a reassessment of valuation.

For example, consider the case in which 1,000,000 shares of a company conducting an initial public offering are offered to prospective purchasers in a second-price, sealed-bid auction. At the nominal end of the auction, the auctioneer may have bids in hand that merit selling the 1,000,000 shares for a price of $20 (i.e., bidders have made bids at or above $20/share for at least 1,000,000 shares). Upon announcing this news, unsuccessful bidders (e.g., those who bid $19.75/share, and realize they will get no shares), may want to bid $20.25 if a second phase of bidding is available.

Of course, the detailed technology does not provide comfort for bidder's remorse in all cases. Often the nominal end of the auction is determined to be the final end—no second phase occurs. However, in the occasional auction in which a second phase is triggered, such second phase allows disappointed bidders to bid higher—a more optimal outcome for them. And the seller may realize a higher price for the subject of the auction—a more outcome for the seller.

One party may be disappointed—the party whose bid would have won if the nominal end of the auction were the true final end of the auction. His success is jeopardized, or it may ultimately come at a higher price. Provision may be made to mitigate that party's disappointment.

For example, the nominal prevailing bidder may be offered a benefit of some sort if the auction enters a second phase. For example, if that bidder is also the prevailing bidder at the end of the second phase of the auction, she may be entitled to a discount over the commission otherwise owed. (E.g., a buyer's commission of 15% may be reduced to 12% in such case.)

Such benefit may be conditioned on one or more factors. For example, the prevailing bidder at the nominal end of the auction may be entitled to the commission discount only if that party bids further in the second phase of the auction—raising the price she ultimately pays.

The disappointed bidder from the first phase of the auction may also receive a benefit if another party ultimately wins the auction in the second phase. For example, the marginal increase in price between the winning bid in the first phase and the winning bid in the second phase may be shared with the disappointed initial winner, e.g., with that party receiving 10%-50% of the increase.

In some cases, auctions conducted subject to a possible second phase may employ a different fee or commission schedule than auctions without this feature. For example, a usual auction may charge a 10% commission to the seller and a 15% commission to the buyer. In contrast, auctions conducted with the possibility of a second phase may charge, e.g., a 12% commission to the seller and a 12% commission to the buyer. This reflects the possibility that a higher winning bid will be received by the seller and paid by a buyer. A given auction may feature a variety of lots—some auctioned in arrangements subject to a second phase, and some without this possibility.

If an auction enters a second phase, the bidding may (but need not) be limited to parties who entered bids in the first phase of the auction. If the last bids in the first phase were $80, $90 and $100, bidding in the second phase may commence at the next increment above $100, or by calling for a previously-made bid (e.g., $80 or $90 or $100), or at some other initial price. The bidder who prevailed in the first phase of the auction may be given the privilege of bidding first in the second phase, or declining to enter the first bid. She may likewise be given the privilege of entering the second bid—if another party bids first. In some auctions, the rules may provide that the prevailing bid entered in the first phase of the auction is not binding if the auction enters a second phase, or may provide that such bid continues to have effect in the second phase.

If the second phase of the auction is of a single (e.g., sealed) bid variety, the time during which bidding is open can be controlled in various ways. It can have a fixed period (e.g., ten minutes; one hour; one day, etc.), or its duration can be a function of a pseudo-random factor.

In some circumstances, a second phase of the auction may be followed by a third phase—again triggered by functions such as are detailed herein.

The decision protocol detailed earlier results in a second phase of the auction—on average—in half of the cases. Other probabilities can, of course, be utilized. E.g., a second phase may be triggered only if the terminal digit of the fast-racing clock is a "0." Such arrangement yields a second phase in about 10% of the auctions.

Decision functions other than simply stopping a clock can be used. For example, a physical process may be sampled at high precision to give a variable independent of circumstances of the auction. For example, the outside temperature may be sampled, and the digit in the "thousandths" decimal place can be used as a determining factor (like the terminal clock digit in the case above). Or the real-time Dow Jones average can be sampled to the nearest penny, and if the sum of the digits is even, then the auction will enter a second phase.

More classically random, or pseudo random factors can also be employed. One is a computer-implemented pseudo-random number generator. Another is selection of one of several air-blown ping pong balls (as are used in some state lottery systems).

The criteria used in deciding whether the auction continues in a second phase can be made dependent on combinations of factors—some not knowable to any bidder prior to the nominal end of the auction (e.g., the arrangements detailed above) in conjunction with other factors (which may be knowable or known). For example, a second phase may be a possibility (e.g., decided by functions like those noted above) only in auctions where the nominal winning bid is below the bottom of the pre-auction estimate range for the winning bid. If the nominal bidding bid is above the bottom of the pre-auction estimate range, then no second phase is considered. Or, a second phase may be considered only if the nominal winning bid is above the top of the pre-auction estimate range for the winning bid (or only if it is within the pre-auction estimate range for the winning bid). Or, a second phase may be undertaken based on a knowable/known factor, alone (i.e., without a random aspect).

Still further, the threshold decision as to whether to consider the possibility of a second phase may depend on bidding activity, e.g., the number or timing of bids received prior to the nominal end of the auction, or the number of bidders. E.g., if the last five bids were a contest between just two bidders, then a second phase may be considered. Or a second phase may be considered if two (or three or five) or more bids were received in the last minute of the auction. Or a second phase may be considered if more than two (or three, or five, or ten, etc.) bidders participated in the bidding. (Or if less than that number participated.) Such tests may alternatively preclude a second phase of the auction, rather than being a necessary (but not sufficient) condition thereto.

In yet other arrangements, a digit sampled from a process independent of the auction (e.g., temperature, time, Dow Jones average, etc.) may be compared with the last digit of the paddle number for the nominal winning bidder; if they match (or if they have the same even/odd state) then a second phase of the auction is triggered.

Having described and illustrated the principles of the technology with reference to specific implementations, it will be recognized that the technology can be implemented in many other, different, forms.

For example, a possible second phase of the auction needn't be triggered by a factor independent of any bidder action. Indeed, arrangements can be employed in which a disappointed bidder can pro-actively trigger a second phase of the auction, e.g., by paying a fee (e.g., 10% of the winning bid at the nominal end of the auction). This fee may be split in various ways, such as with a part of it (either a fixed number, or a percentage) being remitted to the bidder who nominally prevailed in the first phase of the auction. The disappointed bidder may have a predetermined period (e.g., 30 seconds, five minutes, etc.) within which to trigger such a second phase. Or such period may be a function of a random process.

Such a bidder-triggered second phase may—like the arrangements described above—be further conditioned on an independent function. For example, the disappointed bidder may first be required to remit a fee as detailed above, and then be permitted to roll dice (or some other function may be invoked) to determine whether a second phase of the auction will actually occur.

In another variation, rather than giving a possible second chance to a remorseful losing bidder, a possible second chance may be available to a remorseful seller. For example, a seller may set a reserve (minimum) price that, in hindsight, is thought to be too low. At the nominal end of the auction, arrangements like that detailed above may be employed to give the seller the possible opportunity to reset the reserve price higher.

In automated implementations of such technology, the methods, processes, and systems detailed above may be implemented in hardware, software or a combination of hardware and software, as is known from various of the patent publications incorporated by reference.

To provide a comprehensive disclosure without unduly lengthening this specification, applicant incorporates by reference each of the documents referenced herein. Teachings from such documents can be employed in conjunction with the presently-described technology, and aspects of the presently-described technology can be incorporated into the methods and systems described in those documents. Among the documents incorporated by reference are the following:

Klemperer, Auction Theory: A Guide to the Literature. Journal of Economic Surveys, Vol. 13(3), pages 227-286, July 1999;

Narahara et al, Combinatorial Auctions for Electronic Business, Sadhana, April/June, 2005, pp. 179-211;

Sin, An Auction-Based Method for Shared Wireless Medium Access Control, Masters Thesis, MIT, June, 2003.

In view of the wide variety of embodiments to which the principles and features discussed above can be applied, it should be apparent that the detailed arrangements are illustrative only and should not be taken as limiting the scope of the technology.

I claim:

1. A method that involves a reserve condition against which a bid is judged in determining a winning bid in an auction, the method comprising the acts:
   receiving at least one bid from a bidder during a course of the auction;
   declaring a nominal end to the auction; and
   determining, by a computer system, whether the reserve condition may be changed after the nominal end of the auction, by employing a function including a pseudo-random factor based on chance.

2. The method of claim 1, wherein based on a result of said function of changing the reserve condition, the method includes changing the reserve condition to make it more onerous, and extending the auction beyond the nominal end thereof so that one or more bidders might meet said more onerous reserve condition.

3. The method of claim 1 wherein the reserve condition is established before the auction commences.

4. The method of claim 1 in which said determining comprises determining by a computer system that includes a computer-implemented pseudo-random number generator.

5. The method of claim 1, wherein based on a result of said function of changing the reserve condition, the method includes receiving input from a party controlling the reserve condition that changes the reserve condition, and judging the at least one bid in view of the changed reserve condition.

6. The method of claim 5 wherein a bid complying with an initial reserve condition is submitted prior to the nominal end of the action, but does not comply with the changed reserve condition.

7. The method of claim 1 wherein said employing is performed after said declaring.

8. The method of claim 1 wherein said function is independent of any bidder conduct.

9. The method of claim 1 that further includes changing the reserve condition after the nominal end of the auction based on said function.

* * * * *